O. B. HALE.
Sleigh-Runner.
No. 60,884. Patented Jan. 1, 1867.
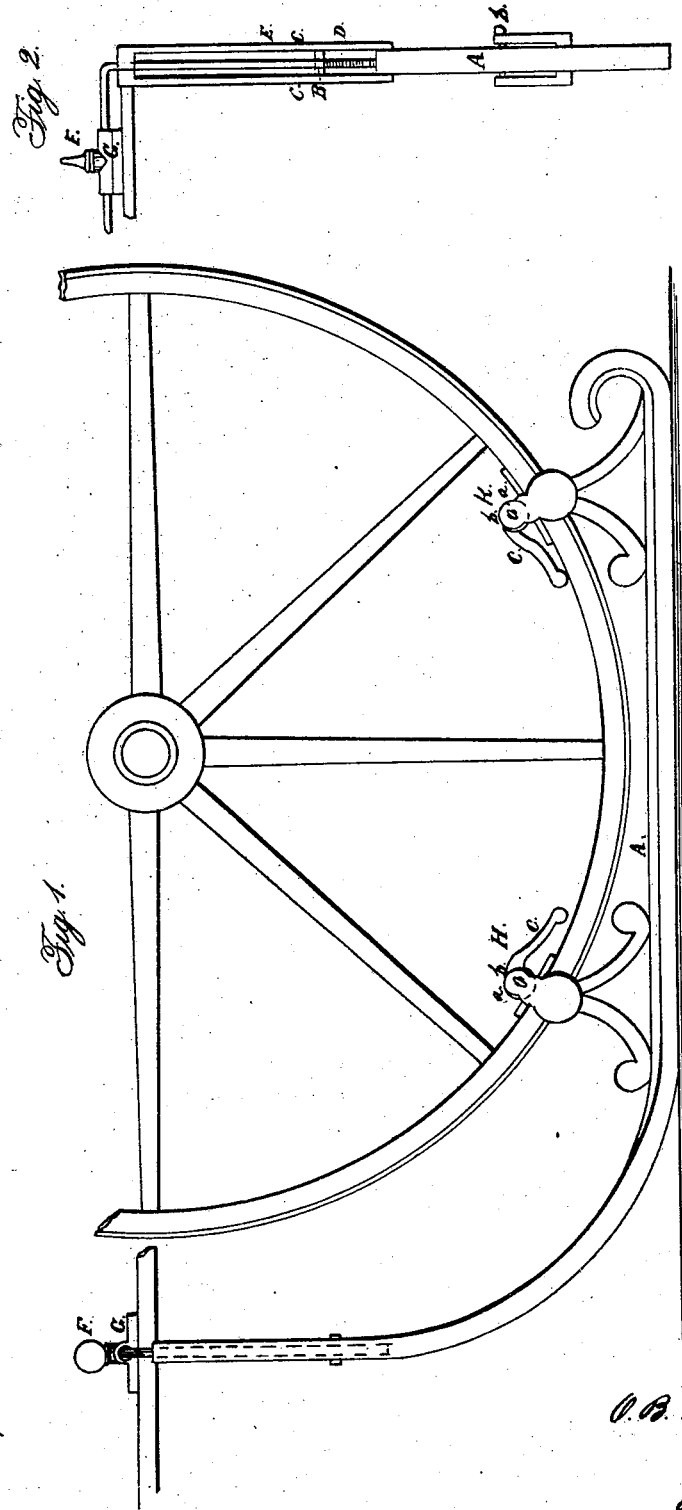
Witnesses:
Inventor:

United States Patent Office.

O. B. HALE, OF CHICOPEE, MASSACHUSETTS.

Letters Patent No. 60,884, dated January 1, 1867.

IMPROVEMENT IN CONVERTING WHEEL CARRIAGES INTO SLEIGHS.

*The Schedule referred to in these Letters Patent and making part of the same.*

TO ALL WHOM IT MAY CONCERN:

Be it known that I, O. B. HALE, of Chicopee, Hampden county, Commonwealth of Massachusetts, have invented a new and useful method of Converting Wheel Carriages into Sleighs; and I do hereby declare that the following is a full and exact description thereof, reference being had to the accompanying drawings, and to letters of reference marked thereon.

This invention relates to an improved runner, so arranged as to be readily adapted and fastened to a wheel of a carriage, so that the same may be readily changed into a sleigh. In construction it consists of a runner, A, formed as shown in the drawings, of which—

Figure 1 is a side, and

Figure 2, a front view of this invention.

This runner is carried up in front, and is fastened to the frame of the carriage by the peculiarly arranged fastening, consisting of the piece B, sliding in ways C C. This slide has a hole drilled through it, in which a thread is cut and the screw D fits; the rod E, on which this screw is cut, extends upward and in towards the frame of the wagon or carriage, and is there fastened by the clamp F G, this arrangement being made to allow for the vibration of the runner or carriage frame. This runner is fastened to the wheel by the clamps H K, formed of the eccentric cams a a, pivoted at b b, having handles, c c, so arranged that when these handles are turned up they (the clamps) loosen, and, when turned down, tighten and fasten the runner to the rim of the wheel. When it is desired to remove the runner from the wheel, the clamps H K are loosened, as described, and the pins b b are removed, the rods E taken out from the clamps F G, and the runner may be removed by simply lifting the wheel from it. The utility of this invention is too obvious to need much explanation, saving, as it does, the expense of a separate vehicle in winter, and rendering persons, when overtaken by snow, able to go on to the end of their journey by placing these runners on their wheels, when otherwise they would be obliged to stop on account of the snow.

I do not claim the attachment of runners to wheel carriages broadly, as that has before been done in various ways, but what I do claim, and desire to secure by Letters Patent, is—

The runner A, when the same is attached to the wheel by means of the clamps H K, and to the frame of the carriage by means of the arrangement of the nut B, rod E, and clamp F G, combined and operating substantially as herein set forth.

O. B. HALE.

Witnesses:
J. B. GARDINER,
J. E. FULLER.